United States Patent

[11] 3,571,801

[72] Inventors John E. Coolidge
Anaheim;
John F. Kinkel, Newport Beach, Calif.

[21] Appl. No. 555,189
[22] Filed June 3, 1966
[45] Patented Mar. 16, 1971
[73] Assignee Granted to National Aeronautics & Space Administration under provisions of 42 USC 2457(d)

[54] DATA TRANSFER SYSTEM
5 Claims, 7 Drawing Figs.

[52] U.S. Cl. 340/172.5, 179/100.2, 340/146.1
[51] Int. Cl. G06f 3/00, G11b 5/00
[50] Field of Search 340/172, 146.1; 179/100.2

[56] References Cited
OTHER REFERENCES

Buffer System, R. A. Skov and E. G. Newman, IBM Technical Disclosure Bulletin, Vol. 2, No. 5, Feb. 1960, pp 86— 89

*Primary Examiner*—Paul J. Henon
*Assistant Examiner*—John P. Vandenburg
*Attorneys*—Leon D. Wofford, Jr., Leon Rawicz, John B. Farmakides, Alvin S. Bass and John H. Warden

ABSTRACT: A data acquisition system effects readout by clocking data from a tape into a storage register under control of a tape shift register. Data is clocked out of the data storage register by a clock shift register. A system clock drives a shift register and divide by 10 circuit which both regulates the translation of the data clocked out of the storage register from a parallel to a precise serial format, and also drives the clock shift register. Output signals from the tape shift register and from the clock shift register drive a digital servocontrol circuit to regulate the speed of the motor which drives the tape transport, to insure the data storage register neither "overflows" nor "runs dry."

PATENTED MAR 23 1971

3,571,801

Inventors
John E. Coolidge
John F. Kinkel
By James J. Jennings, Jr.
Attorney

INVENTORS
John E. Coolidge
John F. Kinkel
By James J. Jennings, Jr.
Attorney

Inventors
John E. Coolidge
John F. Kinkel
By James J. Jennings, Jr.
Attorney

INVENTORS
John E. Coolidge
John F. Kinkel
By James J. Jennings, Jr.
Attorney 3,571,801

INVENTORS
John E. Coolidge
John F. Kinkel
By James J. Jennings, Jr.
Attorney

DATA TRANSFER SYSTEM

BACKGROUND OF THE INVENTION

In certain data acquisition systems, such as a tape recorder unit provided on board a satellite, rocket or other unit which either gathers external information or whose internal performance is monitored, data is frequently recorded as pulses or bits on a magnetic tape. This technique is conventionally termed Pulse Code Modulation (PCM) recording. Because of aberrations in the drive system, when the recorded data is read out, or passed to a telemetry system for transmission and subsequent acquisition, the data pulses removed from the magnetic tape "jitter." That is, there is a difference in time between the instant at which the data pulse actually occurs as it is read out of the tape recorder and the instant at which the data pulse would occur if the data rate were steady and not subjected to time variations caused by imperfect operation of components such as mechanical components in the tape recorder.

The Standards for Telemetry promulgated by the IRIG (Inter-Range Instrumentation Group) specify that for satisfactory data transmission the allowable bit jitter, over a time period which is 10 times the period of a positive data transfer or bit period, is plus or minus 10 percent of a bit period. No magnetic tape transport now available can satisfy this stringent requirement at normal bit or data rates because of fundamental limitations in the mechanical construction and assembly methods of these transports. It is to obviate the jitter or error consequent upon these basic limitations of magnetic tape recorders in PCM data acquisition systems that the present invention has been provided.

SUMMARY OF THE INVENTION

The present invention finds utility in a data transfer system which includes a tape transport and a magnetic tape medium for storing both data information and timing information on the tape. A motor in the recorder operates to drive the magnetic tape transport. In a preferred embodiment the present invention comprises a storage register for accepting the "jittery" data information from the tape recorder, the data being gated in with receipt of the timing information from the same recorder. A readout unit is provided both for applying precise timing signals to the storage register to regulate read out of the jitter-free data information from the storage register, and for receiving the data information as it is read out. In a preferred embodiment a parallel-to-serial converter and temporary buffer storage unit were used to apply the precise timing signals and read out the data in serial format but of course other equipment can be utilized in place of this converter when a parallel-to-serial conversion is not required.

A control circuit is also provided, and is coupled to the motor in the tape recorder for regulating the speed of this motor. This control circuit has a first input connection for receiving a first set of timing signals indicating the rate at which data is transferred from the tape recorder into the storage register, and a second input connection for receiving a second set of timing signals indicating the rate at which data is transferred from the storage register into the parallel-to-serial converter or other readout unit. In accordance with the inventive teaching, the control circuit drives the motor at a speed such that the storage register always has data stored therein, and the register neither overflows nor runs dry. This system produces an output signal in which the data signals occur with a precision equal to that of the precise timing signals supplied by the master clock, and the data output signals are thus completely free of the errors caused by the imperfections inherent in the tape transport system.

THE DRAWINGS

Now in order to acquaint those skilled in the art with the best mode contemplated for making and using the invention, a preferred embodiment thereof will be described in connection with the accompanying drawings, in the several FIGS. of which like reference numerals identify like elements, and in which.

Figure 4:
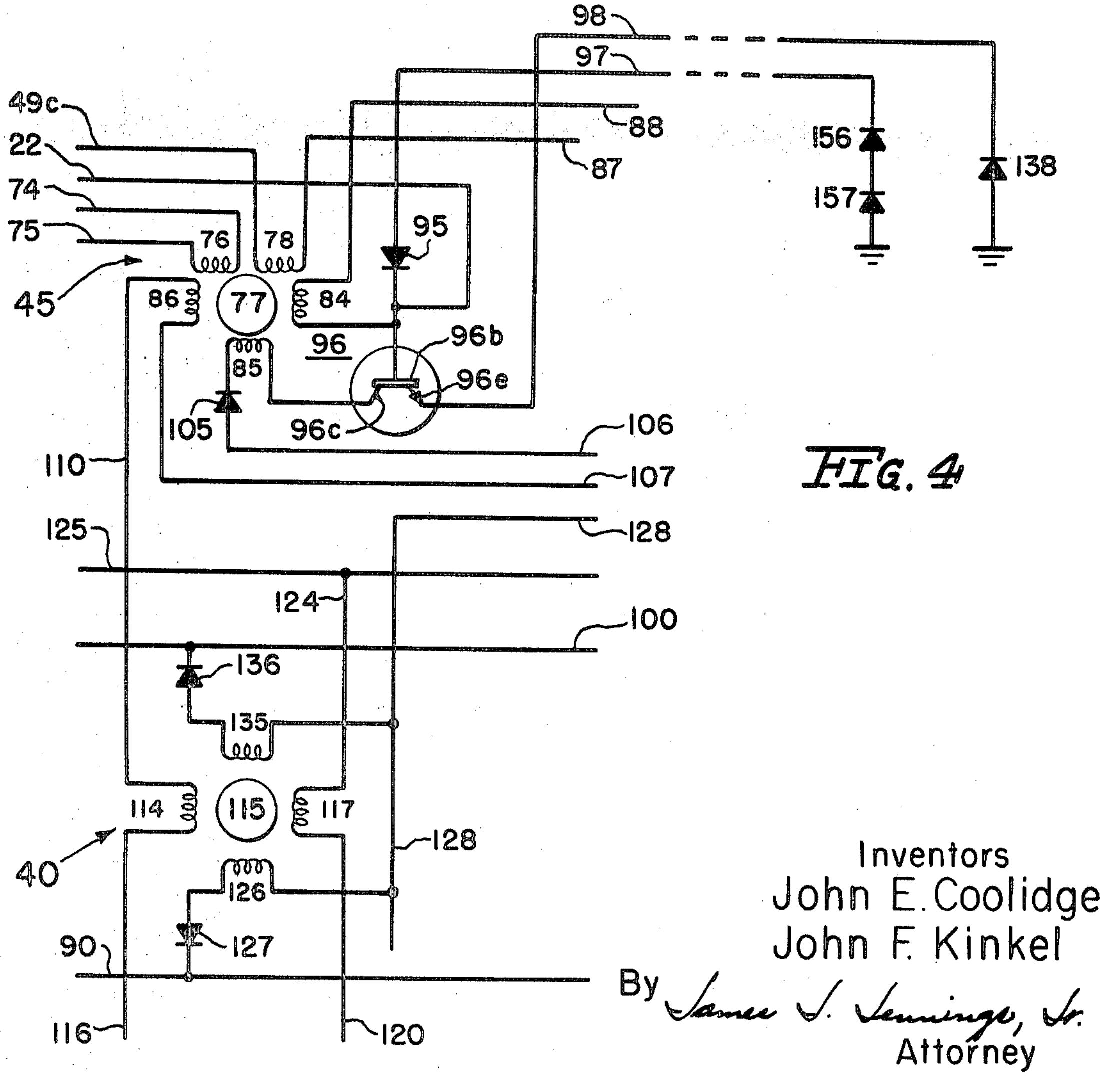
Figure 2:
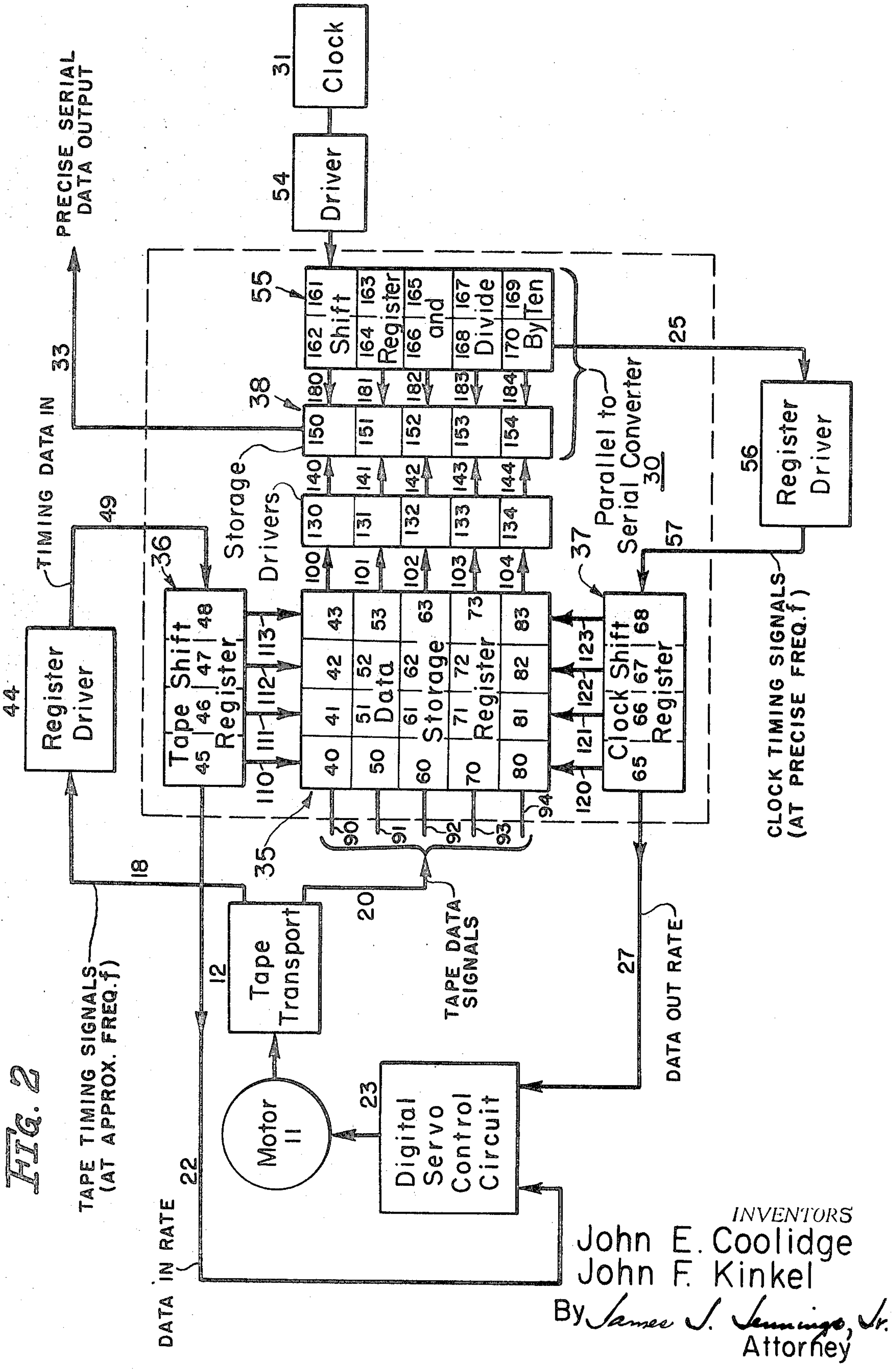
FIG. 2 is a block diagram illustrating portions of the storage register and the readout unit in more detail.
Figure 3A:
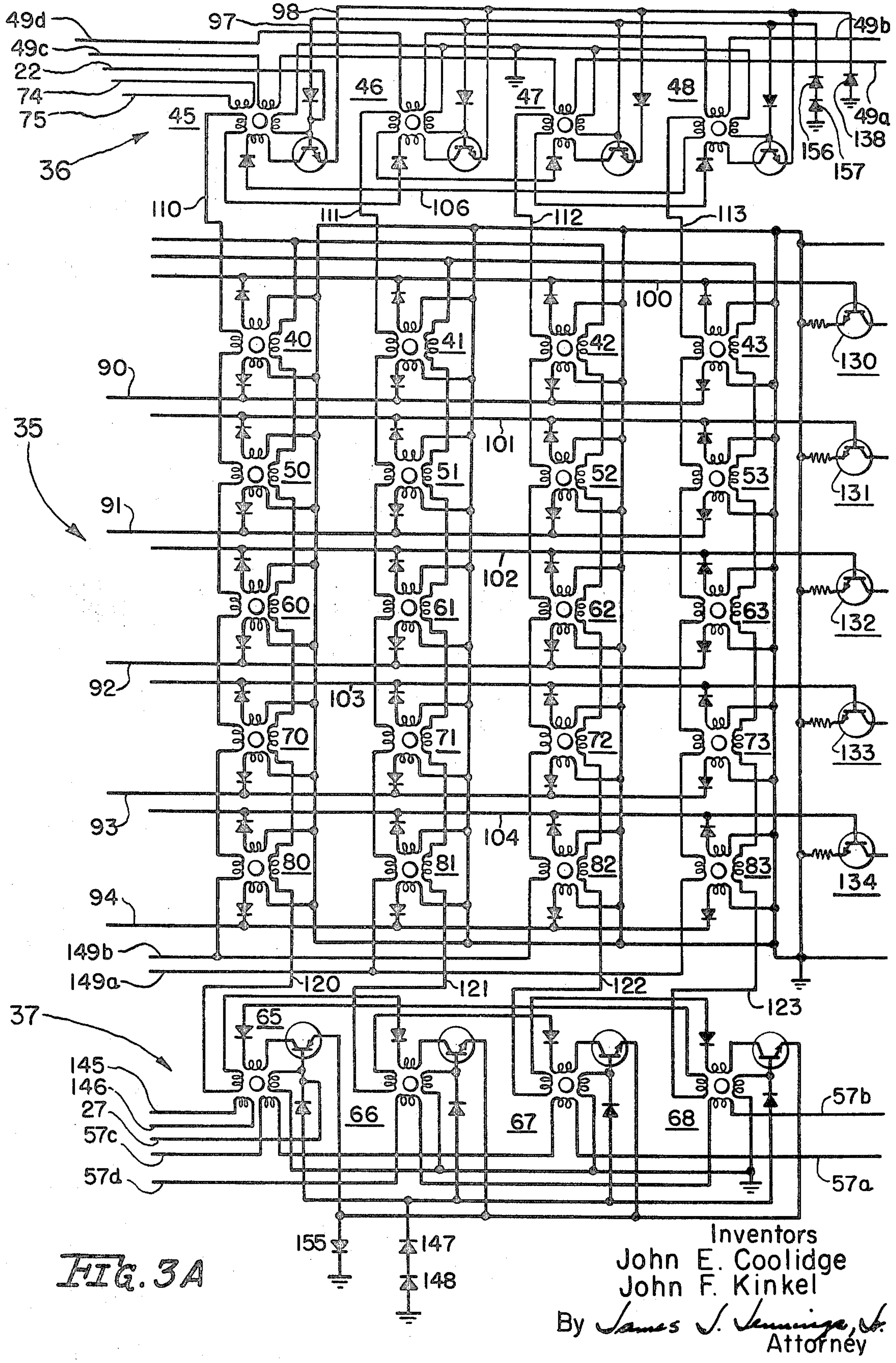
Figure 3B:
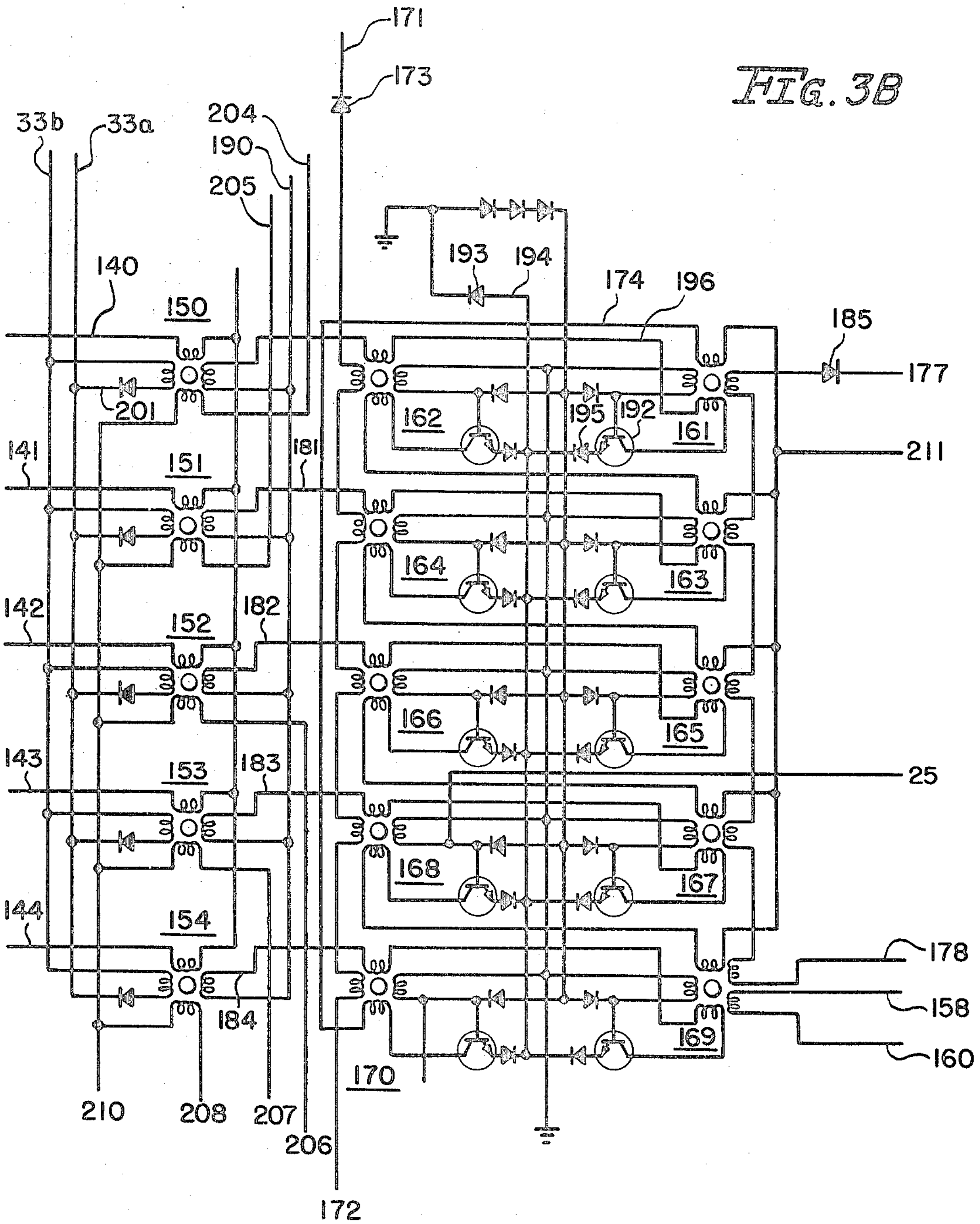
Figure 5:
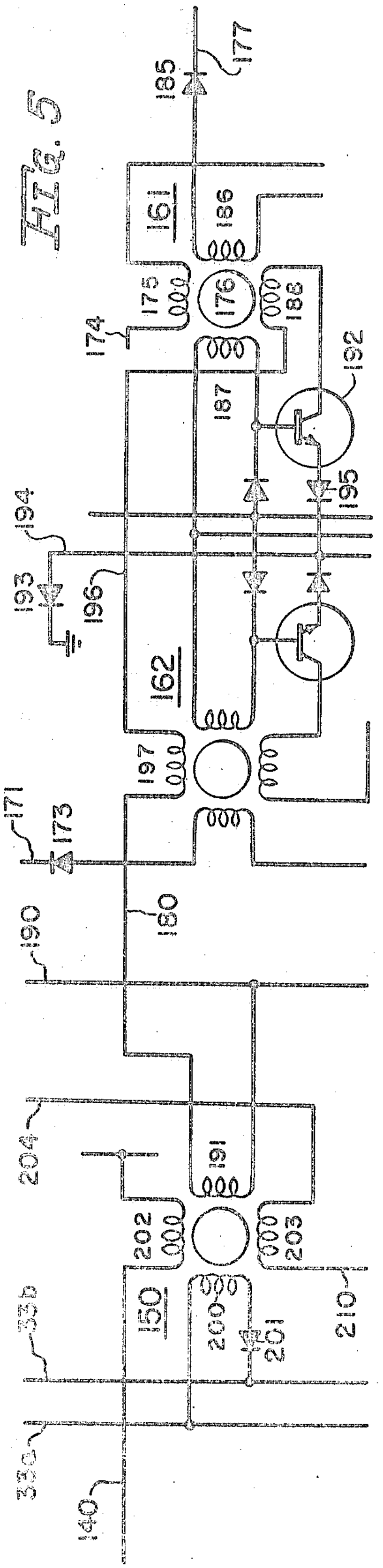
Figure 6:
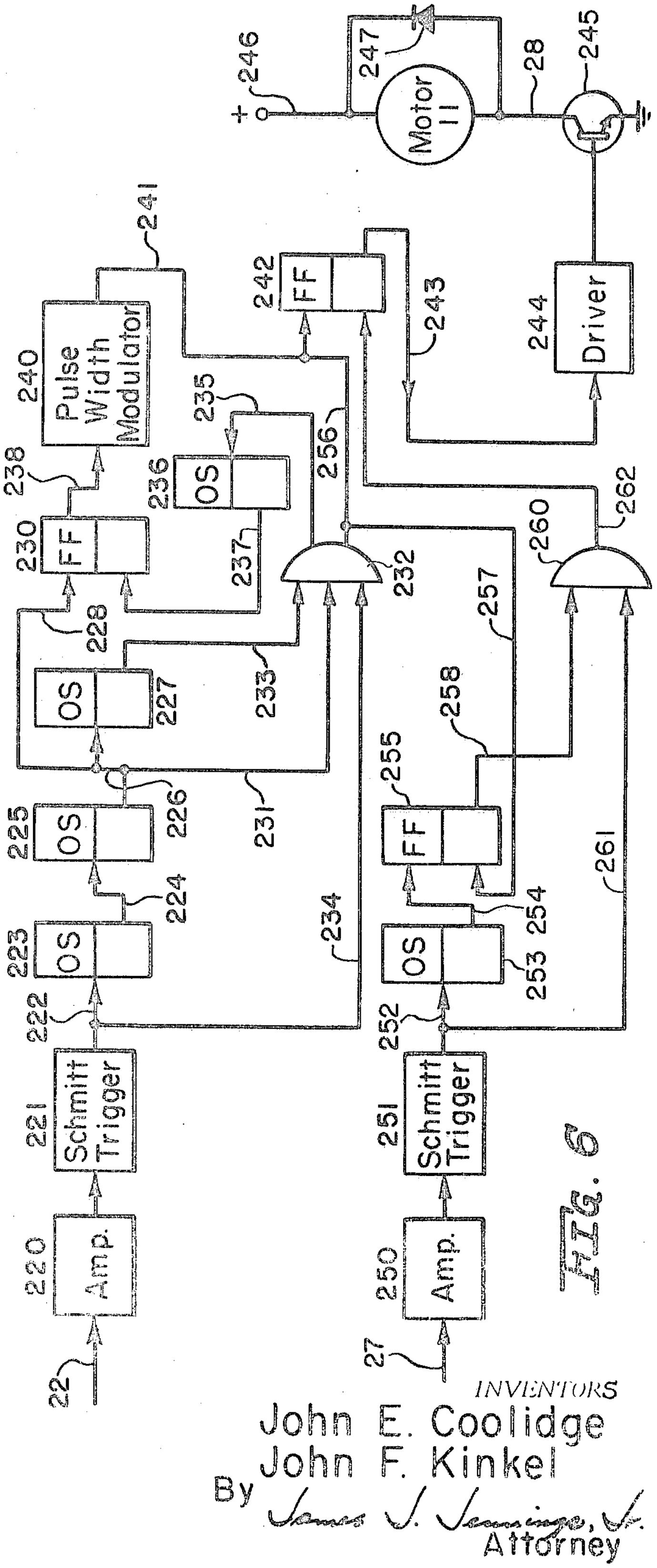

FIGS. 3A and 3B together comprise a schematic diagram illustrating in detail the circuits of the units enclosed within the broken lines in FIG. 2;

FIGS. 4 and 5 are partial schematic diagrams, enlarged with respect to FIGS. 3A and 3B, useful in explaining the operation of the stages shown in FIGS. 3A and 3B; and FIG. 6 is a block diagram of a digital servocontrol circuit useful in the inventive system.

GENERAL SYSTEM CONSIDERATIONS

Figure 1:
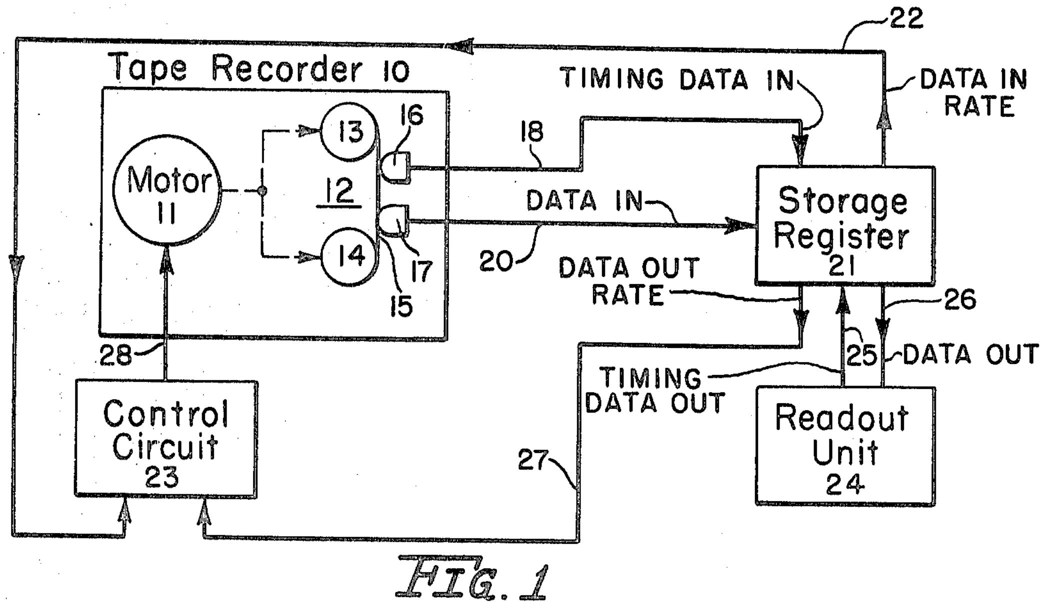
FIG. 1 is a block diagram of a data transfer system useful in explaining the inventive principles.

FIG. 1 shows a tape recorder 10, which includes a motor 11 connected to drive a tape transport 12, shown comprising a pair of reels 13, 14 for supplying and taking up a magnetic tape 15 as the tape passes adjacent heads 16, 17 to provide electrical output signals over conductors 18, 20. Any system can be utilized to supply timing data signals over conductor 18 to storage register 21 in timed relation with the passage of data signals over conductor 20 to the storage register to load the data into this register to load the data into this register. Another timing signal, signifying the rate at which data is loaded into the storage register 21, is passed over conductor 22 and applied to one of the input connections of control circuit 23.

A readout unit 24 is also provided, and this unit applies precise timing signals over conductor 25 to the storage register to gate out or unload the data which the register had previously received over conductor 20 from the tape recorder. It is emphasized that the stability (freedom from jitter) of the data read out of the storage register is determined solely by the characteristics of the precise timing signals or the precise timing reference unit; such unit may be crystal controlled to provide very high stability. Under all conditions the stability of the data read out is independent of the errors in rate inherent in direct readout from the driven tape transport. The data thus read out of storage register 21 is passed over conductor 26 to readout unit 24, for utilization by a computer, print out unit, or other associated equipment which can be considered as within unit 24 or as a separate component, the illustration of which would not be helpful to a complete understanding of the invention.

The rate at which data is read out of storage register 21 is represented by another signal passed over conductor 27 to the other input connection of control circuit 23. This control circuit 23 may comprise a digital servocontrol arrangement for providing a control signal over conductor 28 to motor 11 to regulate the speed of motor 11 as a function of the time relationship between the input signals which control circuit 23 receives over conductors 22 and 27. Because these input signals represent the rates at which data is passed into and removed from storage register 21, the data level within the register is maintained within appropriate limits to insure there is neither an excess nor a shortage of data in the storage register during system operation.

SYSTEM BLOCK DIAGRAM

FIG. 2 shows the storage register and readout unit in somewhat more detailed form. That is, the storage register indicated by a single block 21 in FIG. 1 actually comprises a data storage register 35, a tape shift register 36, and a clock shift register 37. Data storage register 35 includes 20 separate stages identified by the numerals 40—43, 50—53, 60—63, 70—73, and 80—83. As will be described in more detail subsequently, each unit or block within data storage register 35 is a magnetic shift register stage with an input winding for receiving tape data signals over one of the input conductors 90—94, an output winding for passing an output signal over one of the output conductors 100—104, a first shift winding for clocking data in responsive to receipt of a shift-in signal over one of conductors 110—113, and a second shift winding for unloading data responsive to a shift-out signal received over one of conductors 120—123.

A plurality of drivers or amplifiers 130—134 are respectively coupled between the conductors 100—104, which discharge the data in parallel format from the storage register 35, and the output conductors 140—144, which output conductors pass the unloaded data to a temporary buffer storage array 38 having stages 150—154.

Tape shift register 36 comprises four stages 45—48. A register driver 44 is coupled between conductor 18 and another conductor 49 which provides timing input signals to tape shift register 36, to effect the sequential loading of the parallel data signals present on conductors 90—94 into data storage register 35. Like the other drivers shown in FIG. 2, stage 44 is an amplifier utilized to increase the level of the signal received over conductor 18 and enhance the accuracy of system operation. The drivers are not necessary to the basic interconnection and operation of the inventive system.

Another driver 54 is shown connected between a precision oscillator clock 31 and the first stage of assembly 55, which is a "shift register and divide by 10" circuit. Circuit 55 includes 10 stages 161—170 connected for cyclical operation in a well-known manner as successive clock pulses are received from the clock and driver circuits. That is, as the first clock pulse is received the state of stage 161 is changed from 0 to 1, and as the second clock pulse is received from driver 54, stage 162 is operated to a different state (from 0 to 1) as stage 161 is returned to its initial stage (0). In its operation stage 161 both conditions stage 162 for subsequent operation and applies a readout or interrogation pulse over conductor 180 to stage 150 in the temporary buffer storage array 38, gating out the information then stored in stage 150 for passage over conductor 33 to the associated equipment. Likewise when the third clock pulse is received stage 163 will be switched, stage 164 will be conditioned and a gating or readout pulse will be passed over conductor 181 to stage 151 over conductor 33 to the associated equipment. Similarly the fifth, seventh and ninth pulses received from clock 31 and driver 54 sequentially unload the data from stages 152, 153 and 154 and the unloaded bits are passed in serial format over conductor 33 to the associated equipment. As stage 168 is operated from the 0 to 1 state and stage 169 is conditioned for operation, a timing signal is provided over conductor 25 to another register driver 56, which in turn provides a timing signal at a precise frequency over conductor 57 to stage 68 of clock shift register 37.

This timing pulse to the clock shift register will provide a shift-out signal from the appropriate one of stages 65—68 and the associated one of conductors 120—123 to one column of the stages within data storage register 35 and thus shift out another parallel set of data bits over conductors 100—104, drivers 130—134, and conductors 140—144 into stages 150—154 of the temporary buffer storage array 38. These data bits just loaded in parallel format will thereafter be unloaded as a serial train of information bits as the next 10 timing pulses are received from clock 31 and driver 54 to drive circuit 55 through another complete cycle and sequentially unload the stages within temporary buffer storage unit 38. With this initial perspective of the inventive arrangement, a more detailed description will now be provided.

DETAILED DESCRIPTION OF THE INVENTION

Considering FIG. 3A, at the upper right-hand corner a pair of input conductors 49*a* and 49*b* are shown. Over these conductors timing signals are received to load the input data signals on conductors 90—94 into one column of stages in data storage register 35. It is assumed that as the system is initially energized, a conditioning signal is applied over ring set conductors 74, 75 (see FIG. 4) to set winding 76 on core 77 of stage 45. On this same core are a transfer winding 78, a switching or base winding 84, a feedback winding 85 and a drive winding 86. Transfer winding 78 is coupled between conductors 49*c* and 87. One end of base winding 84 is coupled to the common connection between diode 95 and the base 96*b* of an NPN type transistor 96, which also has an emitter 96*e* and a collector 96*c*. The same common connection is also coupled to timing signal output conductor 22.

The anode of diode 95 is coupled to conductor 97, and emitter 96*e* is coupled to conductor 98. Collector 96*c* is coupled to one end of feedback winding 85, and the other side of this winding is coupled through a diode 105 to conductor 106. One end of drive winding 86 is coupled to a conductor 107, and the other end of this winding is coupled over conductor 110 to one end of shift-in drive winding 114 of core 115 in stage 40. The other end of winding 114 is coupled over conductor 116 in series with the shift-in drive windings of each of stages 50, 60, 70 and 80 (not visible in FIG. 4). The shift-out drive winding 117 of stage 40 is coupled between conductors 120 and 124, and conductor 124 is coupled through a diode 127 to conductor 90 and the other side of winding 126 is coupled to conductor 128; one end of read-out winding 135 is also coupled to common conductor 128. The other end of winding 135 is coupled through a diode 136 to conductor 100. With this identification of the windings and control connections of the stages referred to the enlarged showing in FIG. 4, similar terminology will be employed in a description of circuit operation in connection with FIG. 3A.

As there shown, after core 77 of stage 45 has been set as described above, a first timing signal is received between conductors 49*a* and 49*c*. This timing pulse switches the remanent magnetic state of core 77 from the 1 condition back to 0 and induces signal voltages in the other windings. The voltage developed across base winding 84 causes current to flow into base 96*b* of transistor 96 and rapidly switches this transistor on to complete a path for current which flows from input conductor 149*a*, through the series-coupled shift-in drive windings of stages 83, 73, 63, 53 and 43, over conductor 113, the drive winding of stage 48 in the tape shift register, conductor 106, diode 105, feedback winding 85 of stage 45, the collector-emitter path of transistor 96, conductor 98 and diode 138 to ground. Accordingly the parallel data bits then present on conductors 90—94 are simultaneously shifted in over their respective read-in windings and stored in the cores of stages 43, 53, 63, 73 and 83.

Because stage 48 was conditioned for subsequent switching as the data bits were loaded into stages 43, 53, 63, 73 and 83, when the next tape timing pulse from driver 44 arrives over conductors 49*b*, 49*d*, stage 48 is switched and stage 47 is conditioned. At the same time the data bits on conductors 90—94 are loaded into stages 42, 52, 62, 72 and 82. As the next timing pulse is received, this time over conductors 49*a* and 49*c* to alter the state of stage 47 and condition stage 46 for the next switching operation, a shift-in pulse is applied to the shift-in drive windings of each of stages 41, 51, 61, 71 and 81 in data storage register 35. As the next timing pulse from register driver 44 is applied over conductors 49*b*, 49*d*, the stage of stage 46 is changed, stage 45 is conditioned, and a shift-in pulse is applied over conductor 110 to the shift-in drive windings of each of stages 40, 50, 60, 70 and 80 in storage register 35 to load in the data bits on conductors 90—94. As the next timing pulse is received from driver 44 over conductors 49*a*, 49*c*, this pulse switches stage 45 and conditions stage 48 for operation as a shift-in pulse is applied over conductor 113 to the shift-in drive windings of each of stages 43, 53, 63, 73 and 83.

Each time stage 45 is switched, a single timing pulse is issued from winding 84 over conductor 22 to indicate to the digital servocontrol circuit 23 that tape shift register 36 had just been cycled through one complete cycle of operation. In this way the tape shift register 36 is continuously cycled with successive changes in the state of each of stages 45—48 as the tape data timing signals are applied over conductors 49*a*—49*d* to the tape shift register. Register driver 44 can include a multivibrator circuit, or frequency divider circuit, or any other well-known means for dividing the timing signals received over a single conductor 18 for alternate passage over conductors 49*a*, 49*c*and 49*b*, 49*d*to the tape shift register.

Of course if the tape shift register had been continuously cycled as just described the continuous loading of the data bits over conductors 90—94 into the data storage register would have caused the register to overflow if the data had not been shifted out at a rate closely approximating the speed at which data is shifted in. To this end the clock shift register 37 is continuously cycled as the precise timing pulses supplied from register driver 56 are applied first between conductors 57*a*, 57*c*, then between conductors 57*b*, 57*d*, next between conductors 57*a*, 57*c*, and so forth in a manner which will be apparent from the previous explanation in connection with tape shift register 36. Clock shift register 37 also has a pair of input conductors 145, 146 for applying a conditioning pulse to the set winding of stage 65 when the system is initially energized. Register 37 provides output timing signals over conductor 27 to the digital servocontrol circuit 23, one pulse being issued each time stage 65 is switched to indicate the clock shift register has been driven through one complete cycle of operation.

A timing pulse on conductors 57*a*, 57*c* switches stage 65 and conditions stage 68 for operation, simultaneously applying a signal to the series-coupled shift-out drive windings of stages 43, 53, 63, 73 and 83. The data bits are shifted out of these stages over conductors 100—104, drivers 130—134, and conductors 140—144 into stages 150—154 of register 38. These bits are serially unloaded from register 38, as will be explained hereinafter, before the next timing pulse is supplied by register driver 56. This next pulse is applied over conductors 57*b*, 57*d* to switch stage 68 from 1 to 0, condition stage 67 by switching it from 0 to 1, and applying readout signals to the series-coupled shift-out drive windings of stages 42, 52, 62, 72 and 82. The operation of clock shift register 37 is identical to that of tape shift register 36.

It is noted that a pair of diodes 147, 148 are coupled in the base return path of clock shift register 37, and one diode 155 is coupled in the emitter return path. These connections are analogous to the connections of diodes 156, 157 in the base return path of tape shift register 36, and the single diode 138 in the emitter return path of this same register. The importance of these diodes will now be described in connection with FIG. 4.

The series circuit coupled to feedback winding 85 includes the negligible resistance of the collector-emitter path of transistor 96, and the resistances of diodes 105 and 138. However between base winding 84 (or the base of transistor 96) and ground there is a resistance of three series-coupled diodes 95, 156 and 157. Accordingly with the lower resistance connected in series both with the feedback winding of stage 45 and the drive winding of stage 48, a larger current flows therethrough to switch the core in stage 48 from 0 to 1 before current has ceased to flow in feedback winding 85 of stage 45, that is, before stage 45 (more specifically, core 77) has been switched from 1 back to 0. Another way of expressing this operation is that the switching bit is "stuffed into" stage 48, and this stuffing operation is completed, before the bit is completely removed from stage 45. With receipt of the next timing pulse over conductor 49*b*, the core of stage 48 will be switched back from 1 to 0 after stage 47 is already "stuffed" with a bit or switched from 0 to the 1 condition.

Considering now the operation of the system after five parallel bits have been passed over conductors 140—144 into the respective temporary buffer storage stages 150—154, parallel-to-serial converter 55 (FIG. 3B) operates sequentially to gate the data bits out of temporary buffer storage 38 over conductors 33*a*, 33*b*. It is assumed that as the equipment is initially energized a signal is applied over conductors 158, 160 to the set winding of stage 169, which induces a signal in the base winding of this stage which gates its associated transistor on to complete a path for current flow through the feedback winding of stage 169 and the shift winding of stage 170. Thus as the first driving pulse is received from driver 54 and applied between conductors 171, 172, current flows through diode 173 and the series-coupled transfer windings of each of stages 162, 164, 166, 168 and 170. The feedback winding of stage 170 is coupled over conductor 174 in series with the feedback winding 175 of the first stage 161 of the shift register and divide by 10 circuit. Accordingly at this time only stage 161 is in the 1 condition so receipt of the next precisely timed pulse from driver 54 will switch the core 176 of stage 161 back to the 0 state.

Referring now to FIG. 5, the next clock pulse issued from driver 54 is applied between conductors 177, 178 to cause current flow through diode 185 and the series-coupled transfer windings of each of stages 161, 163, 165, 167 and 169. Accordingly signal voltages are induced in base winding 187 and feedback winding 188 of stage 161.

At this time a suitable operating potential is also supplied (or this potential can be maintained continuously) to conductor 190, which is coupled to the interrogation winding 191 of stage 150 and also to the interrogation winding of each of the other stages 151—154 in the temporary buffer storage register 38. Thus the signal induced in base winding 187 of stage 161 operates in a manner obvious from the previous explanation of shift registers 36 and 37 to rapidly gate on transistor 192 and complete the path for current flow through this transistor which path extends from ground over diode 193, conductor 194, diode 195, the emitter-collector path of transistor 192, feedback winding 188 of stage 161, conductor 196, shift winding 197 of stage 162, conductor 180, and interrogation winding 191 of stage 150 to conductor 190. This interrogation operation effectively reads out any bit stored in stage 150 over the output winding 200, diode 201, and output conductors 33*a*, 33*b* to associated equipment (not shown). The data bit was previously shifted in over conductor 140 and input winding 202. The other input winding 203 represents an auxiliary input connection over which data can be passed directly into the temporary buffer storage array 38 over conductors 204—208, with conductor 210 being the common conductor over which the respective auxiliary windings of stages 150—154 are connected. These auxiliary connections lend flexibility and enhanced utility to the inventive system, in that parallel bit data can be accepted from other equipment such as radio receivers, teletype units, and so forth, and converted to a serial format in the units 38 and 55.

Upon application of the next clock timing pulse, which is received over conductors 171, 172 from driver 54, the core of stage 162 is switched from the 1 back to the 0 state, and stage 163 is switched from the 0 to the 1 state. Receipt of succeeding clock timing pulses drives the parallel to serial converter 30 in a continuous operation in a manner manifest from the explanation in connection with FIG. 5.

It is apparent that with subsequent switching of stage 163 from 1 to 0 and conditioning of stage 164 by switching from 1 to 0, the bit then stored in stage 151 will also be read out over conductors 33*a*, 33*b*. In the same manner the parallel bits are sequentially gated out of stages 152—154, to provide a precise train of serial data pulses for use with associated equipment.

It is noted that the sync pulse which is passed over conductor 25 (for passage through the register driver 56 and operation of the clock shift register 37) is coupled to the transfer winding of stage 168. By selecting the appropriate stage for sync connection a desired phase displacement between the timing signals applied to digital servocontrol circuit 23 can be established. Another adjustment of this phase difference can also be effected by regulating the time duration of operating units within the digital servocontrol circuit, as will be apparent from the following description.

FIG. 6 shows a schematic diagram of a digital control circuit suitable for regulating the speed of motor 11 in the tape recorder at a rate which maintains the quantity of data in the storage register between appropriate limits. The input conductor 22, which receives signals from the tape shift register 36 denoting the rate at which data is fed into the data storage register, is coupled through a limiting amplifier stage 220 to a Schmitt trigger or square wave generator stage 221. A first output connection from stage 221 is made over conductor 222 to the center or set connection of a one shot (OS) multivibrator 223, the 0 output terminal of which is coupled over conductor 224 to another one shot multivibrator stage 225. In a preferred embodiment each of stages 223 and 225 were selected to have an operating time of 490 microseconds, so that together these two stages comprise (in effect) a 980 microsecond delay line. The 0 output terminal of stage 225 is coupled over conductor 226 to the set input connection of another single shot multivibrator 227, and the same terminal of stage 225 is coupled over conductors 226, 228 to the upper input connection of a flip-flop stage 230. A third connection is made from the 0 output terminal of stage 225 over conductor 231 to the center input connection of a double AND gate 232. The operating time of stage 227 is selected to be short with respect to that of stages 223, 225. In a preferred embodiment stage 227 had an operating time of 40 microseconds. An output connection is made from the 0 terminal of stage 227 over conductor 233 to the upper input terminal of gate 232. The lower input connection to double AND gate 232 is made over conductor 234, which receives signals from Schmitt trigger stage 221.

The upper output terminal from gate 232 is coupled over conductor 235 to the set input terminal of stage 236, which is a single shot multivibrator. In a preferred embodiment stage 236 had an operating time of 10 microseconds. The 0 output terminal of stage 236 is coupled over conductor 237 to the lower input terminal of flip-flop 230, of which the 1 output terminal is coupled over conductor 238 to a pulse width modulator 240. The circuitry within pulse modulator 240 operates in a well-known manner, such as by charging control capacitors for a regulated time period, to produce an output pulse that is a function of the time period that flip-flop 230 remains in the 1 condition. For example, a pulse can be produced at the end of this period to apply a signal over conductor 241 to the upper input terminal of flip-flop 242, the 0 output terminal of which is coupled over conductor 243 and a driver stage 244 to the base of an NPN-type transistor 245. The collector of this transistor is coupled over conductor 28 to one side of motor 11, to the other side of which a suitable positive energizing potential is provided over conductor 246. A diode 247 is coupled in parallel with motor 11.

In the lower part of FIG. 6 input conductor 27, which receives rate signals from the clock shift register 37 denoting the rate at which the data pulses are unloaded from the storage register, is coupled through a limiting amplifier 250 to a Schmitt trigger stage 251. One output signal from stage 251 is taken over conductor 252 and applied to the set input connection of a one shot multivibrator 253, the 0 output connection of which is coupled over a conductor 254 to the upper input connection of a flip-flop 255.

The lower output connection from double AND gate 232 is coupled over a conductor 256 to the upper input connection of flip-flop stage 242. The same output connection of stage 232 is also coupled over conductor 257 to the lower input connection of flip-flop or multivibrator stage 255, the 0 output connection of which is coupled over conductor 258 to the upper input connection of an AND gate 260. Schmitt trigger stage 331 is coupled over conductor 261 to the other input connection of AND stage 260, and the output connection from gate 260 is coupled over conductor 262 to the lower input connection of flip-flop 242.

In operation of the servocontrol circuit, precise signals indicating the rate at which data is discharged from the storage register are received over conductor 27 and passed through amplifier 250, Schmitt trigger stage 251, AND gate 260, flip-flop 242, and driver 244 to gate on transistor 245 and drive motor 11. The irregular timing signals denoting the rate at which the tape shift register is operated, and thus the rate at which data is fed into the storage register, are received over conductor 22 and applied through amplifier 220 to Schmitt trigger stage 221. The output on stage 221 is passed over conductor 222 to initiate operation of the series-coupled one shot multivibrator 223, 225. It is noted that by varying the total time duration of this effective delay line (223, 225) another measure of regulation of the phase control between signals appearing on conductors 22 and 27 can be effected.

The output signal from one shot multivibrator 225 is applied to flip-flop stage 230, to another one shot multivibrator stage 227, and to an input connection of double AND gate 232. The 0 output terminal of one shot stage 227 is also coupled to another input terminal of gate 232. With signals now present on conductors 233 and 231, as the next timing pulse is received over conductor 22 and initiates operation of Schmitt trigger 221, another pulse is applied over conductor 234 and an output signal issues from gate 232 over conductor 235. This output signal actuates one shot multivibrator 236, which applies an output signal to the lower input connection of flip-flop 230, returning stage 230 to its normal condition. Accordingly this time period, between the operation of stage 225 to change the state of stage 230 and the reset of stage 230, determines the time of operation of pulse width modulator 240 and thus the time at which an output pulse is issued over conductor 241 to reset flip-flop 242 and deenergize driver 244. The voltage which the motor "sees" is essentially a steady state voltage of a duration sufficient to maintain the desired phase difference between the rate at which data is clocked into the storage register and the rate at which the data is read out. Should the load on the motor change because of conditions in the tape transport, the servosystem automatically compensates to provide accurate operation of the complete system.

Any small changes in the rate at which data is fed into the buffer storage register will effectively change the length of the time period during which flip-flop 230 is actuated to correspondingly change the time at which the output pulse issues from modulator 240 to deenergize driver 244.

SUMMARY

The present invention provides an accurate, fast-operating system for discharging data from a magnetic tape, which data is subjected to jitter or time-displacement errors by reason of the fundamental limitations of the mechanical tape transport. However by utilizing the precise timing signals from the clock shift register as a reference, to govern the rate at which data is shifted out of the register, jitter-free output data is obtained from the register at a very precise rate and completely free of the errors which were present as the data was shifted into the register. By correlating the speed of motor 11 as a function of the time interval between receipt of one set of timing signals over conductor 27 and another set of timing signals over conductor 22, control circuit 23 automatically regulates motor 11 to drive the tape transport at the appropriate speed. In this way the amount of data within register 35 is always regulated within suitable limits to operate at the maximum speed possible without causing overflow of the register. Likewise the under-speed condition is avoided and the storage register never is permitted to run dry. With this system precise, jitter-free data pulses are provided.

While only a particular embodiment of the present invention has been described, it is apparent that various modifications and alterations may be made therein. It is therefore the intention in the appended claims to cover all such modifications and alterations as may fall within the true spirit and scope of the invention.

We claim:

1. In a data transfer system including a tape transport, a magnetic tape medium for storing both data information and timing information thereon, and a motor operative to drive the tape transport:

a data storage register for accepting said data information from the tape medium subject to jitter as the data is gated in by said timing information and for discharging the data, a tape shift register for receiving said timing information from the magnetic tape medium to regulate the passage of said data information from the magnetic tape medium into said data storage register, and for providing a first set of timing signals in accordance with the cycling of said tape shift register, a clock shift register for receiving precise timing signals to regulate the read out of the data information from the data storage register, and for providing a second set of timing signals in accordance with the cycling of said clock shift register;

a readout unit comprising a temporary buffer storage array for receiving data information read out of said data storage register, and a shift register and divide by 10 circuit coupled to said temporary buffer storage array, operative in accordance with receipt of precise timing signals to sequentially gate the data information out of said temporary buffer storage array and to provide precise timing signals to said storage register each time said shift register and divide by 10 circuit is cycled; and a control circuit, having an output terminal coupled to said motor, a first input connection for receiving said first set of timing signals indicating the variable rate at which data is transferred from the tape recorder into the data storage register, and a second input connection for receiving said second set of timing signals indicating the precise rate at which data is transferred from the data storage register into the temporary buffer storage array, said control circuit regulating energization of the motor at a speed such that the data storage register always has data stored therein and neither overflows nor runs dry.

2. In a data reproducing system including a tape transport, a magnetic tape for storing both data signals and timing signals thereon, and a motor for driving the tape transport:

a storage register for accepting said data signals from the magnetic tape as the data, then subjected to jitter-type error, is gated in in parallel format by said timing signals;

a parallel-to-serial converter including a temporary buffer storage array for receiving the data signals in parallel format from said storage register, and a shift register and divide by 10 circuit for receiving precise timing signals from a master source and for gating the data signals out of said temporary buffer storage array at a precise, jitter-free rate in accordance with receipt of said precise timing signals, and for passing a timing signal to said storage register each time said parallel-to-serial converter is cycled; and a digital servocontrol circuit, coupled to said motor, having a first input connection for receiving first timing signals from said storage register connoting the rate at which data is gated into said storage register, and a second input connection for receiving second timing signals from said storage register connoting the rate at which data is gated out of said storage register, thereby to drive the motor at a speed such that the storage register always has data stored therein, and the register neither overflows nor runs dry.

3. A data reproducing system as claimed in claim 2 in which said storage register includes a tape shift register having an input circuit for receiving said timing signals from the magnetic tape and an output circuit for passing the first timing signals to said digital servocontrol circuit to indicate the rate at which data is shifted into the storage register, and a clock shift register having an input circuit for receiving said timing signals from the shift register and divide by 10 circuit and an output circuit for passing the second timing signals to said digital servocontrol circuit to indicate the rate at which data is shifted out of the storage register.

4. A data reproducing system as claimed in claim 2 in which said storage register includes:

a data storage register including a plurality of signal storage stages intercoupled in a matrix having a first number of rows and a second number of columns, including a number of input conductors corresponding to said first number and respectively coupled to the rows of storage stages for shifting data signals into said data storage register in parallel format, and a number of output conductors also corresponding to said first number and respectively coupled to the rows of storage stages for shifting data signals out of said storage register in parallel format;

a tape shift register comprising a number of shift stages corresponding to said second number, at least one input conductor for receiving the timing signals from said magnetic tape, a plurality of output conductors respectively coupled between said shift stages and the columns of storage stages in said matrix for regulating the shifting in of data signals over said data storage register input conductors, and another output conductor for passing said first timing signals to the digital servocontrol circuit as said tape shift register is cycled; and a clock shift register comprising a number of shift stages also corresponding to said second number, at least one input conductor for receiving said timing signals from the shift register and divide by 10 circuit, a plurality of output conductors respectively coupled between said shift stages in the clock shift register and the columns of storage stages in said matrix for regulating the shifting out of data signals over said data storage register output conductors, and another output conductor for passing said second timing signals to the digital servocontrol circuit as said clock shift register is cycled.

5. A data reproducing system as claimed in claim 2 in which said digital servo control circuit comprises a flip-flop stage which is changed from a first state to a second state in timed relation with receipt of said second timing signals from the storage register and which is returned from said second state to said first state in timed relation with receipt of said first timing signals from the storage register, to control energization of said motor for the appropriate time interval to maintain the level of data signals in said storage register between proper levels so that the register neither overflows nor runs dry.